United States Patent [19]

Shaw et al.

[11] Patent Number: 4,462,699

[45] Date of Patent: Jul. 31, 1984

[54] FIBER COUPLER TEMPERATURE TRANSDUCER

[75] Inventors: Herbert J. Shaw, Stanford; Michel J. F. Digonnet, Menlo Park, both of Calif.

[73] Assignee: Board of Trustees of the Leland Stanford Junior University, Stanford, Calif.

[21] Appl. No.: 300,954

[22] Filed: Sep. 10, 1981

[51] Int. Cl.$^3$ ............................ G01J 5/08; G02B 5/172
[52] U.S. Cl. .................... 374/131; 350/96.15; 350/96.21; 356/43; 374/159
[58] Field of Search ............... 374/130, 131, 161, 129, 374/159; 350/96.15, 96.16, 96.13, 96.22, 96.21; 356/43

[56] References Cited

U.S. PATENT DOCUMENTS

| | | | |
|---|---|---|---|
| 2,964,993 | 12/1960 | Witt | 356/43 X |
| 3,051,038 | 8/1962 | Duke | 350/96.33 X |
| 3,455,625 | 7/1969 | Brumley et al. | 350/96.22 |
| 3,698,813 | 10/1972 | Aisenberg | 374/130 X |
| 3,704,996 | 12/1972 | Borner et al. | 350/96.15 |
| 3,922,550 | 11/1975 | Crowley et al. | 374/128 X |
| 3,936,142 | 2/1976 | Kersten | 350/96.15 |
| 3,948,345 | 4/1976 | Rosencwaig | 356/432 X |
| 4,045,668 | 8/1977 | Pitt et al. | 250/227 |
| 4,081,215 | 3/1978 | Penny et al. | 374/127 X |
| 4,113,345 | 9/1978 | Gerndt | 350/96.15 |
| 4,151,747 | 5/1979 | Gottlieb et al. | 73/339 |
| 4,159,420 | 6/1979 | Tsunoda | 350/96.33 |
| 4,201,446 | 5/1980 | Geddes et al. | 350/96.29 |
| 4,275,295 | 6/1981 | Menningen et al. | 250/227 |
| 4,307,933 | 12/1981 | Palmer et al. | 350/96.15 X |
| 4,313,344 | 2/1982 | Brogardh et al. | 374/129 X |
| 4,315,666 | 2/1982 | Hicks, Jr. | 350/96.15 |
| 4,325,604 | 4/1982 | Witte | 350/96.15 |

FOREIGN PATENT DOCUMENTS 811026673 10/1981 European Pat. Off. .
WO81/00618 3/1981 PCT Int'l Appl. .

OTHER PUBLICATIONS

Publ.: "Single-Mode Fiber Optic Directional Coupler", Bergh et al., pp. 260-261, Electronics Letters, Mar. 27, 1980, vol. 16, No. 7.
Nakagome Patent Abstracts of Japan, vol. 2, #125, published Oct. 20, 1978, p. 7467 E 78.
Lagakos et al.; "Multi Mode Optical Fiber Displacement Sensor," Applied Optics, vol. 20, #2, (Jan. 1981), pp. 157-168.
Serizawa; Japanese Patent No. 54-118255 issued Sep. 13, 1979, Bergh et al., "Single Mode Fiber Optics Directional Coupler," Electronics Letters, vol. 16, #7, Mar. 27, 1980.

*Primary Examiner*—Daniel M. Yasich
*Attorney, Agent, or Firm*—Knobbe, Martens, Olson & Bear

[57] ABSTRACT

A transducer for the measurement of temperature incorporates a fiber optic coupler having a coupling efficiency which varies in relation to the index of refraction of a thin layer of index matching liquid, such as index matching oil, placed between the optical fibers of the coupler. Since the index of refraction of the liquid varies predictably with temperature, the coupling efficiency of the transducer may be used to directly measure the temperature of the coupler and its surroundings.

20 Claims, 10 Drawing Figures

FIBER COUPLER TEMPERATURE TRANSDUCER

BACKGROUND OF THE INVENTION

This invention relates to temperature sensors used for the accurate measurement of temperature, particularly in hostile environments. The application relates to the measurement of temperature with high resolution over a predetermined dynamic range.

The most commonly used temperature sensors of the prior art which provide an electrical signal output are thermocouples. Such devices are constructed by joining two pieces of different metals, often in the shape of thin wires, at a junction located in the environment whose temperatures are to be measured. Temperature changes at this junction modify the electrical potential of each of the metals, and, since the metals react differently, a potential difference is generated between the two metals at the junction. Such thermocouples provide a high degree of temperature sensitivity, providing as much as 60 millivolts of signal increase per degree celsius of temperature change. These thermocouples can be directly connected to analog or digital gauges to provide an accurate, repeatable measurement of temperature at the thermocouple junction.

Calibration tables exist for all common metal pairs, such as chromel-constantan or iron-constatan. Additionally, such thermocouples operate over broad temperature ranges from as low as −150 degrees Celsius to as high as 2500 degrees Celsius with relatively small error (sometimes as low as 0.5% over the entire temperature range). Because thermocouples have a low mass, and therefore a low thermal mass, they reach equilibrium with their environment very rapidly, especially when they are constructed to be extremely thin. Response times as low as 1 millisecond are known. While thermocouples can be protected to withstand hostile chemical environments, they are susceptible to induced errors from electromagnetic interference. In addition, unless well-protected by shielding which would necessarily increase the thermal mass and the response time of the thermocouple, these devices may be sensitive to some corrosive environments.

SUMMARY OF THE INVENTION

The present invention utilizes the temperature sensitivity of index matching oil to provide a fiber optic coupler as the basis for a high resolution, non-electromagnetic temperature transducer.

More specifically, applicant has found that the coupling efficiency of a single mode fiber optic coupler is predictably variable in response to changes in the refractive index of index matching oil placed between the optical fibers which make up the coupler.

In a specific configuration for utilizing a fiber optic coupler for temperature measurement, a single mode fiber optic coupler, using evanescent field coupling, is provided, including a pair of optical fibers mounted in a face-to-face configuration within a pair of bases or substrates. The substrates are carefully superimposed to provide a predetermined coupling efficiency at a selected temperature and are then rigidly interconnected in this selected mutual placement. Oil, having a refractive index which varies in a predictable manner with temperature, fills a space between the bases or substrates. Any one of plural disclosed configurations may be utilized for maintaining a predetermined thickness of such oil between the faces of the coupler substrates.

By supplying light to the coupler input, the utilizing photo detectors at the primary and secondary coupler outputs, the ratio of light at these outputs may be measured. This ratio may be directly transformed into a measurement of the temperature of the fiber optic coupler and its surroundings.

Since the fibers exiting the fiber optic coupler from opposite ends would normally require that the coupler, and in turn the area whose temperatures are to be measured, must be placed between the light source and the detectors, techniques have been developed for providing measurement of the coupling efficiency exclusively from one side of the coupler. One of these techniques involves the looping of the output ends of the optical fibers over the surface of the coupler and rigidly bonding these output ends to the coupler surface to protect them from damage. A second technique involves the reflection of the coupled branch power at the output end, and the use of a secondary coupler to normalize out any laser output fluctuations which would otherwise be interpreted as temperature variations. This second method requires an optical isolator at the laser light source to prevent laser output fluctuations which would result from feedback through the primary optical coupler.

In order to keep the thermal mass of the coupler low and to thus decrease the response time of the coupler to temperature changes in the measured environment, the bases or substrates used to support the optical fibers are ground to the smallest practical dimensions.

These and other advantages of the present invention are best understood through reference to the the drawings, in which:

FIGS. 1 through 4 are identical to FIGS. 1 through 4 in the co-pending patent application described below which is incorporated herein by reference. These figures include:

DETAILED DESCRIPTION OF THE PREFERRED EMBODIMENT

Referring initially to FIGS. 1 through 4, a fiber optic coupler is shown which provides the transducing element of the temperature transducer of the present invention. This fiber optic coupler, along with the method for manufacturing it, is described in detail in co-pending patent application Ser. No. 139,511 filed Apr. 11, 1980, entitled "FIBER OPTIC DIRECTIONAL COUPLER" by H. J. Shaw and R. A. Bergh assigned to the assignee of the present invention. That co-pending patent application is hereby incorporated herein by reference. Nonetheless, a brief description of FIGS. 1 through 4 will be provided to permit an understanding of the essential characteristics of the fiber optic coupler.

The coupler 10 includes two strands, 12a and 12b, of a single mode fiber optic material mounted in longitudinal arcuate grooves 13a and 13b, respectively, formed in optically flat confronting surfaces 14a and 14b, respectively, of rectangular bases or substrates 16a and 16b, respectively. The strands 12a and 12b can, for example, be secured in place using epoxy glue 38.

Each of the strands 12a and 12b comprises a commercially available fiber of quartz glass which is doped to have a central core and an outer cladding. The applicant has found that the present invention works effectively with single mode fibers, which typically have a core diameter in the order of 10 microns or less, and a cladding diameter on the order of 125 microns.

The arcuate grooves 13a and 13b have a radius of curvature which is very large compared to the diameters of the strands 12. Thus the fiber optic strands 12a and 12b, when mounted in the grooves 13a and 13b, respectively, gradually converge toward the center and diverge toward the edges of the substrates 16a and 16b. At the centers of the substrates 16, the depth of the grooves 13 which mount strands 12 is less than the diameter of the strands 12, while at the edges of the blocks 16, the depth of the grooves 13 is preferably at least as great as the diameter of the stands 12. Fiber optic material is removed from each of the strands 12a and 12b to form respctive oval shaped, planar surfaces 18a, and 18b which are co-planar with the confronting surfaces 14a, 17b, respectively, of the substrates 16a and 16b, respectively. In the embodiment shown, the coupler halves 10a and 10b are identical and are assembled by placing the confronting surfaces 14a and 14b of the substrates 16a and 16b together so that the surfaces 18a and 18b of the strands 12a and 12b are in facing relationship. An index matching substance (19), such as index matching oil, is provided between the confronting surfaces 14a, 14b. This substance has a refractive index approximately equal to the refractive index of the cladding and also functions to prevent the optically flat surfaces 14 from becoming permanently locked together. It is the temperature sensitivity of this oil (the changes in its refractive index with temperature) which permits the coupler 10 to measure temperature.

An interaction region 32 is formed at the junction of the strands 12. In this region 32 light is transferred between the strands 12a, 12b be evanescent field coupling. Furthermore, as explained in the above referenced copending patent application, when the spacing between the cores of the stands 12 is within a critical zone, each strand receives a significant portion of the evanescent field energy from the other strand and optimum coupling is achieved without significant energy loss. For a single mode fiber having a step index gradient, the critical zone can be quite narrow. In a single mode fiber of the type shown in FIGS. 1 through 4, for example, the required center-to-center spacing between the strands 12 at the center of the coupler is typically less than a few (for example, 2–3) core diameters.

Figure 1:
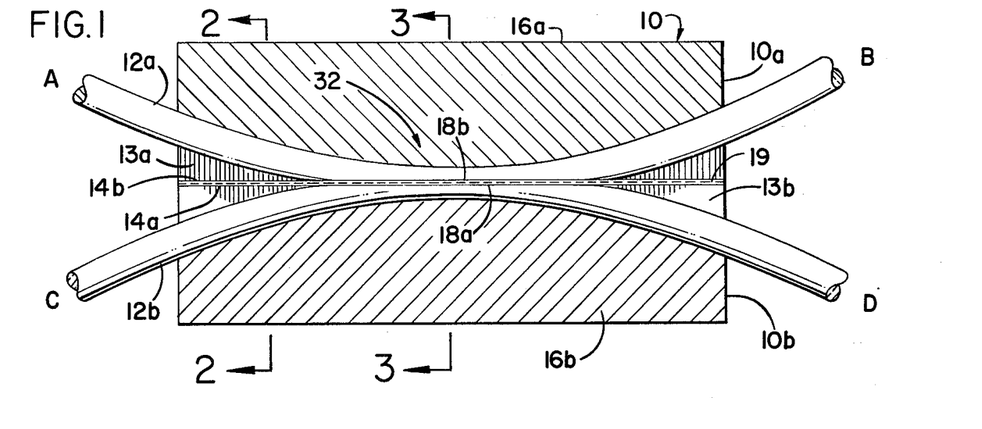
FIG. 1 is a cross-sectional view of the fiber optic coupler used in the present invention.
Figure 2:
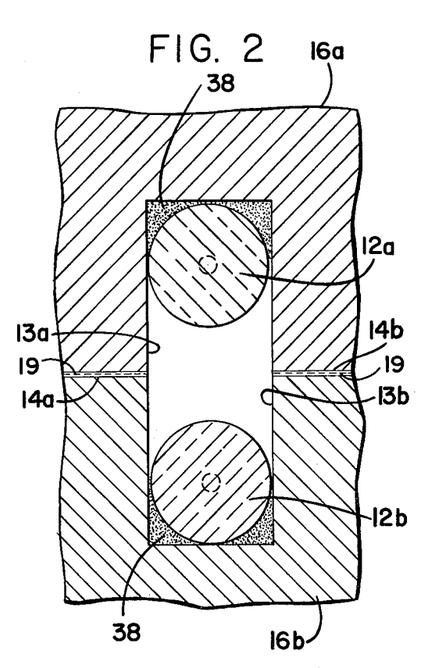
FIGS. 2 and 3 are cross-sectional views of the coupler of FIG. 1, taken along lines 2—2 and 3—3, respectively.
Figure 3:
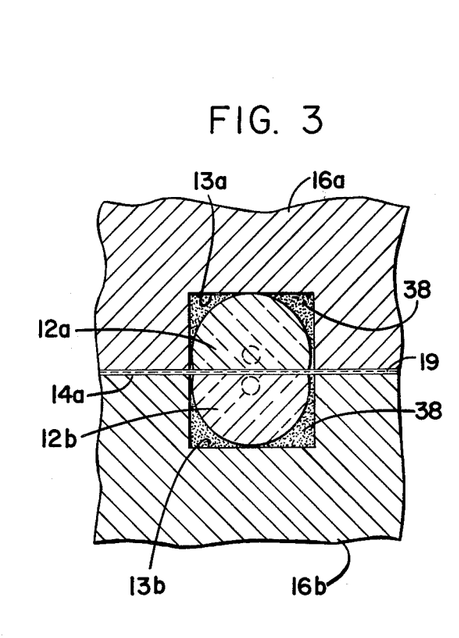
Figure 4:
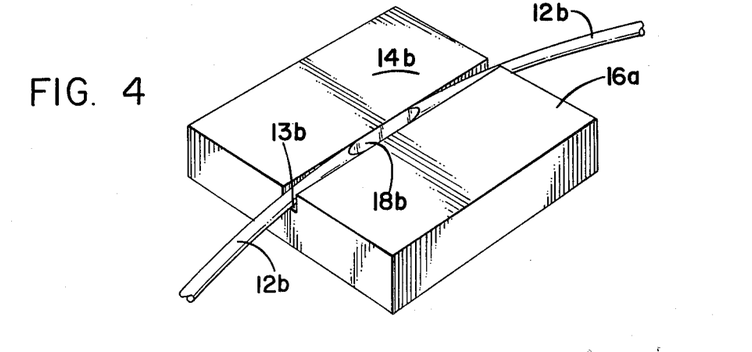
FIG. 4 is a perspective view of one element of the coupler of FIG. 1, separated from the other element thereof to show the configuration of the confronting face of said element.

Preferably the strands 12a and 12b are symmetrical through the interaction region 32 in the plane of the facing surfaces 18 so that the facing surfaces 18a and 18b are coextensive if superimposed.

The coupler 10 includes four ports labeled A, B, C and D in FIG. 1. If it is assumed that input light of a suitable wavelength (for example, 1.15 microns) is applied to port A, this light passes through the coupler and is output at port B and/or port D, depending on the amount of power that is coupled between the strands 12. In this regard, the term "normalized coupled power" is defined as the power ratio of the coupled power to the total output power. In the above example, the normalized coupled power would be equal to the ratio of the power at port D to the sum of the power output at ports B and D. This ratio is also referred to as the "coupling efficiency" and when so used is typically expressed as a percent. Thus, when the term "normalized coupled power" is used herein, it should be understood that the corresponding "coupling efficiency" is equal to the normalized coupled power times 100.

The coupler 10 operates on evanescent field coupling principles in which guided modes of the strands 12 interact through their evanescent fields to cause light to be transferred between the strands 12. As previously indicated, this transfer of light occurs at the interaction region 32. The amount of light transferred is dependant upon the proximity and orientation of the cores as well as the effective length of the interaction region 32 and the index of refraction of the oil separating the substrates 16a and 16b. If the length of the interaction region 32 and the separation of the strands 12 within this region 32 are properly selected, and if the index of refraction of the oil exactly matches that of the fiber cladding, light within the coupler will make only one transfer between the strands 12 as it travels through the interaction region 32. If the coupler is properly constructed, it is possible under such conditions to couple 100% of the light input at port A to port D. If the length of the interaction region 32 is further increased, or the separation between the strands 12 further reduced, a phenomenon referred to herein as "overcoupling" will occur in which the light will transfer back to the strand from which it originated. Several orders of "overcoupling" are possible. Thus, as the interaction length is still further increased or the separation is still further reduced, the light will make several transfers between the strands. This phenomenon is explained in detail in the incorporated copending application. Thus, the light may make multiple transfers back and forth between the two strands 12 as it travels through the region 32, the number of such transfers being dependant on the length of interaction region 32, the spacing of the strands 12 within this region and the refraction index of the oil.

Figure 5:
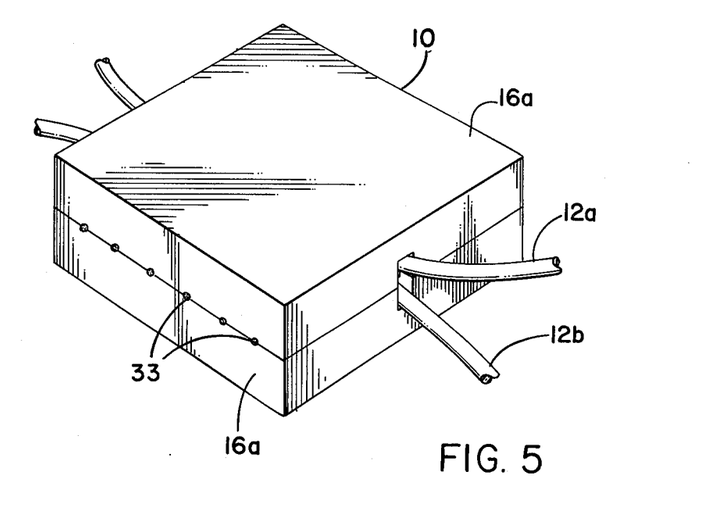
FIG. 5 is a perspective view showing a first structure for rigidly interconnecting the bases or substrates of the coupler of FIG. 1 for use in temperature measurement.

In order to utilize the coupler described above for temperature measurements, it is necessary for substrates 16a and 16b to be aligned or tuned using the technique described in the above referenced co-pending application to provide a coupling efficiency which is approximately midway along a relatively linear portion of a curve of coupling efficiency versus core spacing. This will increase the linearity of the temperature measurement. Once the coupler has been tuned to this preferred fiber spacing, the technique shown in FIG. 5 may be utilized. As shown in that figure, the upper substrate 16a and lower substrate 16b may be welded along their outside edges using a low melting temperature glass 33 to prevent shifting of the substrates. Since the size of the substrate should be reduced to the greatest extent possible to lower the thermal mass of the coupler 10, the substrates 16a and 16b may be clamped together in the preferred orientation and the edges ground prior to application of the welding glass 33. Prior to this welding operation, the substrates 16a and 16b should be separated from one another by a layer of index matching oil.

Figure 6:
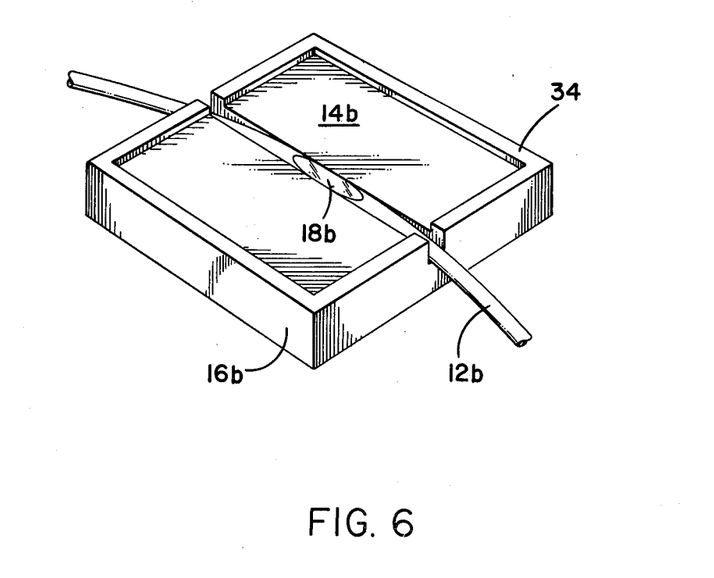
FIG. 6 is a perspective view showing one base or substrate of the coupler of FIG. 1 incorporating a dam for precisely separating the coupler substrates in a temperature measuring coupler.

In the embodiment shown in FIG. 6, a thicker layer of index matching oil of uniform cross-section may be applied between the substrates 16a and 16b by providing, on the substrate 16b, a thin dam 34 which surrounds the face of the substrate 16b which abuts against the substrate 16a. This dam 34 will hold the index matching oil near the coupling region and will additionally provide a bonding area for attaching the two substrates 16a and 16b together. The dam 34 should be deposited on the substrate 16b after the substrates 16b and 16a have been ground to the smallest size possible. Fabrication of the dam 34 can be easily achieved using standard vacuum deposition techniques which provide accurate, low-thickness films as thin as 10 angstroms. A preferable thickness for the dam 34 is approximately 1 micron. Once the dam 34 has been deposited, molecular bonding may be used, enhanced by ultrasonic waves, to attach the dam and thus the substrate 16b to the face of the substrate 16a, after the coupler has been accurately tuned. Alternatively, a thin bonding agent may be used between the dam 34 and the substrate 16a.

Figure 7:
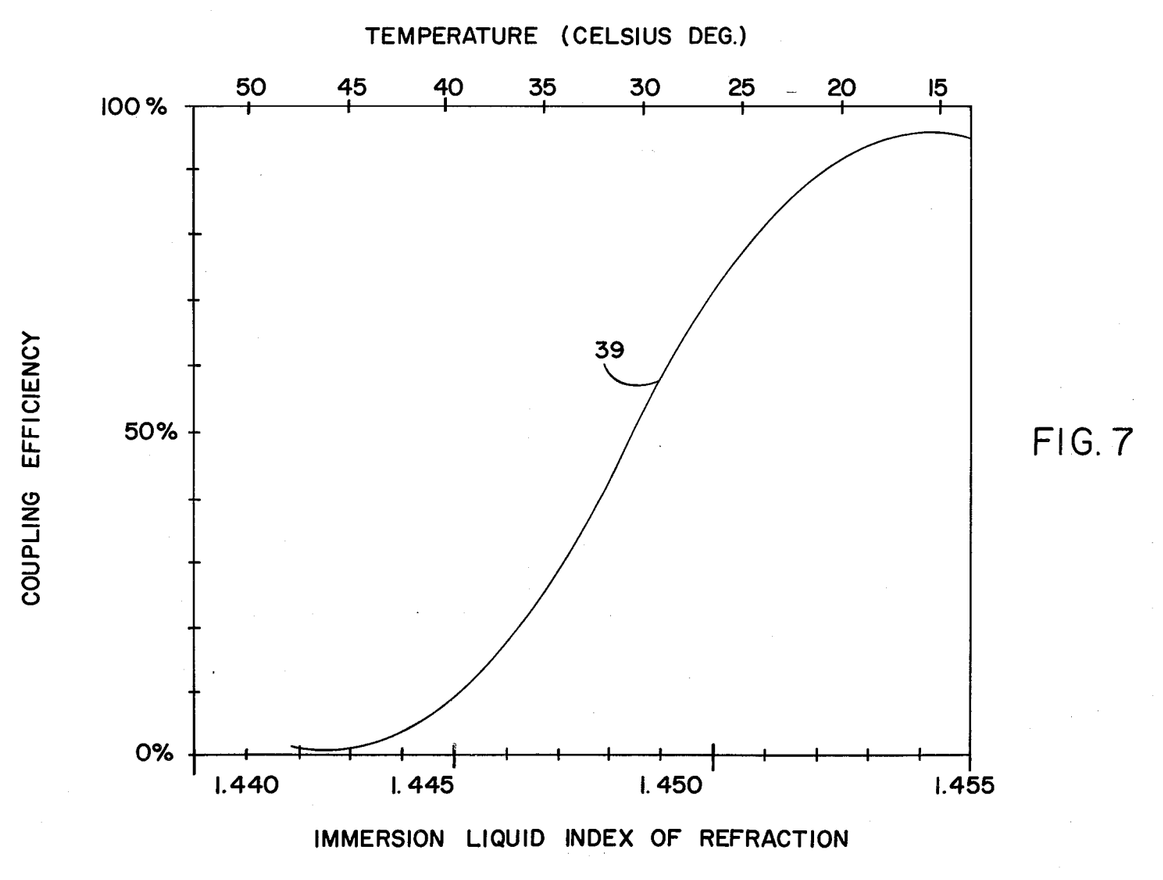
FIG. 7 is a charge showing the relationship between temperature in degrees Celsius and coupling efficiency for a particular coupler used for temperature measurement.

The curve 39 of FIG. 7 graphically illustrates the effect of temperature on the index of refraction of a typical index matching oil which is placed between the substrate 16a and 16b on coupling efficiency. Curve 39 also show the relationship between temperature in degrees Celsius and this index of refraction and, in turn, the relationship between temperature and coupling efficiency.

As can be seen from the exemplary curve 39, a typical index matching oil can provide relatively linear changes in coupling efficiency between temperatures of approximately 20 degrees and 43 degrees Celsius. By selecting oils having different characteristic refractive indices with temperature, temperatures within different ranges may be measured, and different resolution measurements of temperature may be achieved.

Figure 8:
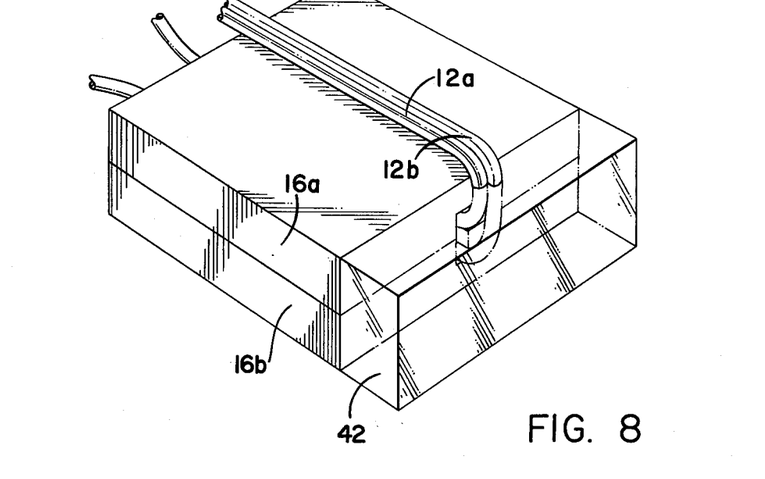
FIG. 8 is a perspective view showing a first fiber optic arrangement for permitting the input and output fibers to exit from the coupler exclusively on one side and thus permitting the coupler to measure temperatures at the distal end of the fiber optic connections.

The coupler may be used in the configuration shown in FIG. 1, with the input light being supplied to port A and the output light at ports B and D, being measured to determine coupling efficiency for the coupler 10 if the environment whose temperatures are to be measured can conveniently be placed between the light source and the photo detectors. Since this is often not the case, the arrangement of FIG. 8 may be utilized to permit the light source and photo detectors all to be mounted exclusively on one side of the coupler 10 and to thus allow the coupler 10 to be inserted into a thermal environment to be measured at the distal end of the optical fibers. In the arrangement shown in FIG. 8, the optical fibers 12a and 12b exiting the coupler 10 at ports B and D may be looped over the upper substrate 16a and bonded to the upper surface of the substrate 16a by any suitable bonding agent. In this configuration, it is advisable to melt low temperature glass 42 onto the end of the coupler 10 to encapsulate and protect the looped portion of the fibers 12a and 12b.

Figure 9:
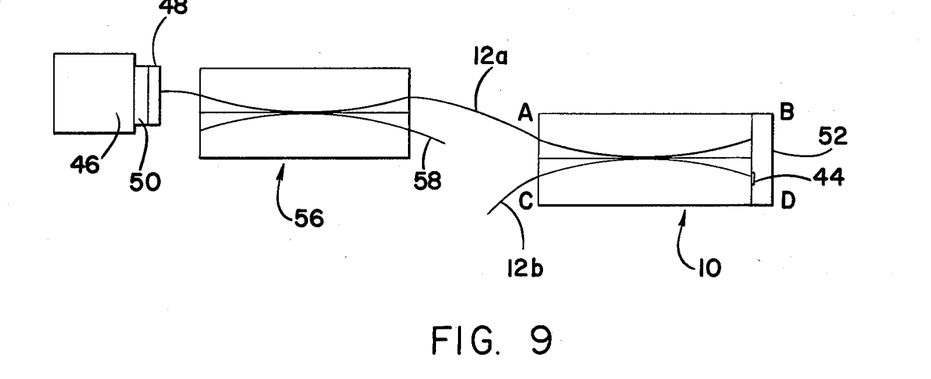
FIG. 9 is a schematic representation showing the use of an optical isolator and a secondary fiber optic coupler to permit temperature measurements using a fiber optic coupler having fiber elements exiting exclusively from one end of the primary coupler and thus providing temperature measurement at the distal end of the fiber optic elements.

An alternative arrangement for providing the coupler 10 at the distal end of the optical fiber interconnections is shown in FIG. 9. In this configuration, the fibers 12a and 12b are cut flush with the end of the coupler 10 at the ports b and d (FIG. 1). A mirror 44 is placed against the end of the fiber 12b at port d to reflect all of the coupled branch power toward the coupler. The temperature dependent optical signal may then be detected at the second input side fiber 12b at port c, which thus becomes an output channel. The signal magnitude, $P_O$, is proportional to $P_I(E)(1-E)$ where E is the temperature dependent coupling efficiency of the fiber coupler.

When using the configuration shown in FIG. 9, it is necessary to protect the laser diode 46 from power reflected by the mirror 44 and coupled back to the fiber strand 12a. This protection is accomplished by an optical isolator which prevents such reflected power from introducing laser output fluctuations. Such optical isolation is accomplished, for example, by using a quarter wave plate 48 combined with a polarizer 50 in a well known manner.

The mirror 44 may be simply deposited on the polished end surface of the coupler 10 where the output fiber 12b has been cut. A metallic type of mirror is preferable to a dielectric, multi-layered type mirror whose reflection coefficient is also temperature sensitive. A layer of glass 52 may be vacuum deposited on the top of the mirror 44 to provide extra mechanical protection.

In this arrangement, a second optical coupler 56 is utilized along the input fiber 12a to normalize out any laser output or launching efficiency fluctuations that would otherwise be interpreted as temperature variations. Output from the coupled strand 58 of this coupler 56 is used as a reference for measuring the ratio of coupling efficiency.

Figure 10:
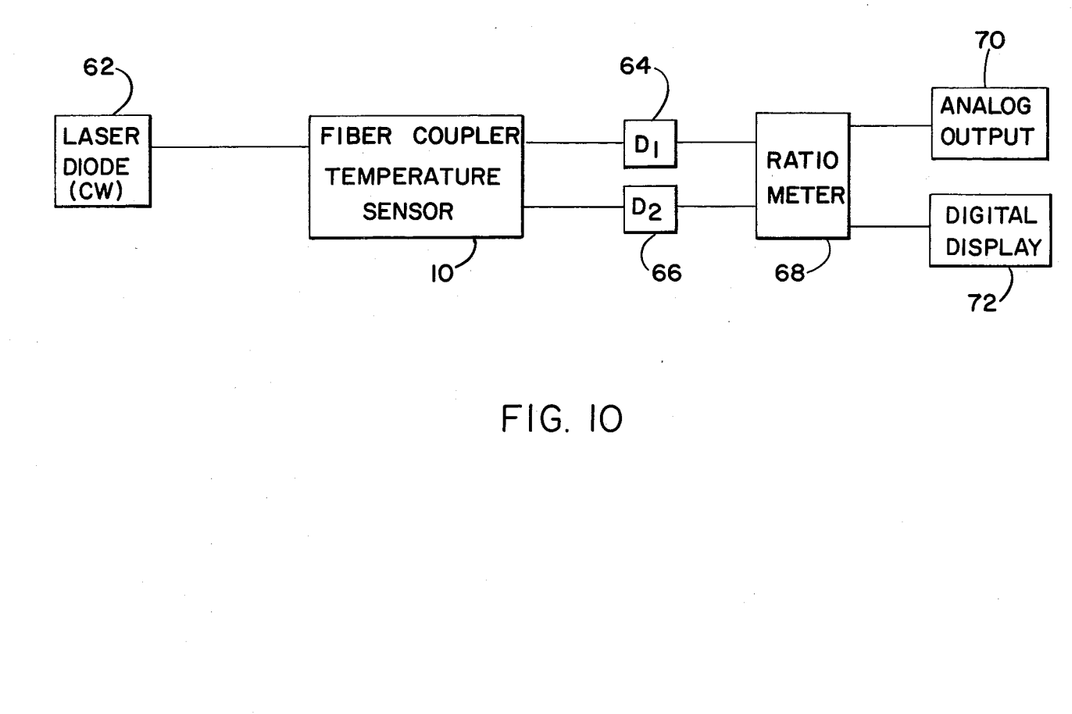
FIG. 10 is a schematic diagram of an electrical circuit used for measuring the coupling coefficient of a fiber optic coupler used for temperature measurement.

Referring now to FIG. 10, an electrical system is shown for measuring the ratio of light output of ports B and D (FIG. 1) to provide a measurement of coupling efficiency, and to thus generate an electrical signal which is proportional to temperature. In the arrangement shown in FIG. 10, a laser diode 62 provides a continuous wave signal to the fiber optic coupler 10 and specifically to port A (FIG. 1). The outputs from ports B and D are connected, respectively, to detectors 64 and 66, each of which provides an output electrical signal proportional to the light intensity at ports B and D, respectively. The electrical signal output from the detectors 64, 66 are supplied to a ratio meter 68 which provides a direct measurement of the ratio between the output light at port D and the output light at both ports B and D. This output is supplied as an analog output for operating other equipment at 70 and as a digital display 72 for providing a direct display of temperature. It will be understood that the analog output 70 and digital display 72 may include a scaling factor or constant selected to provide direct temperature measurement in an appropriate measurement unit, such as Celsium or Farenheit. The ratio meter 68, along with its analog and digital outputs, is a readily available electronic device well known in the prior art.

Figure 11:
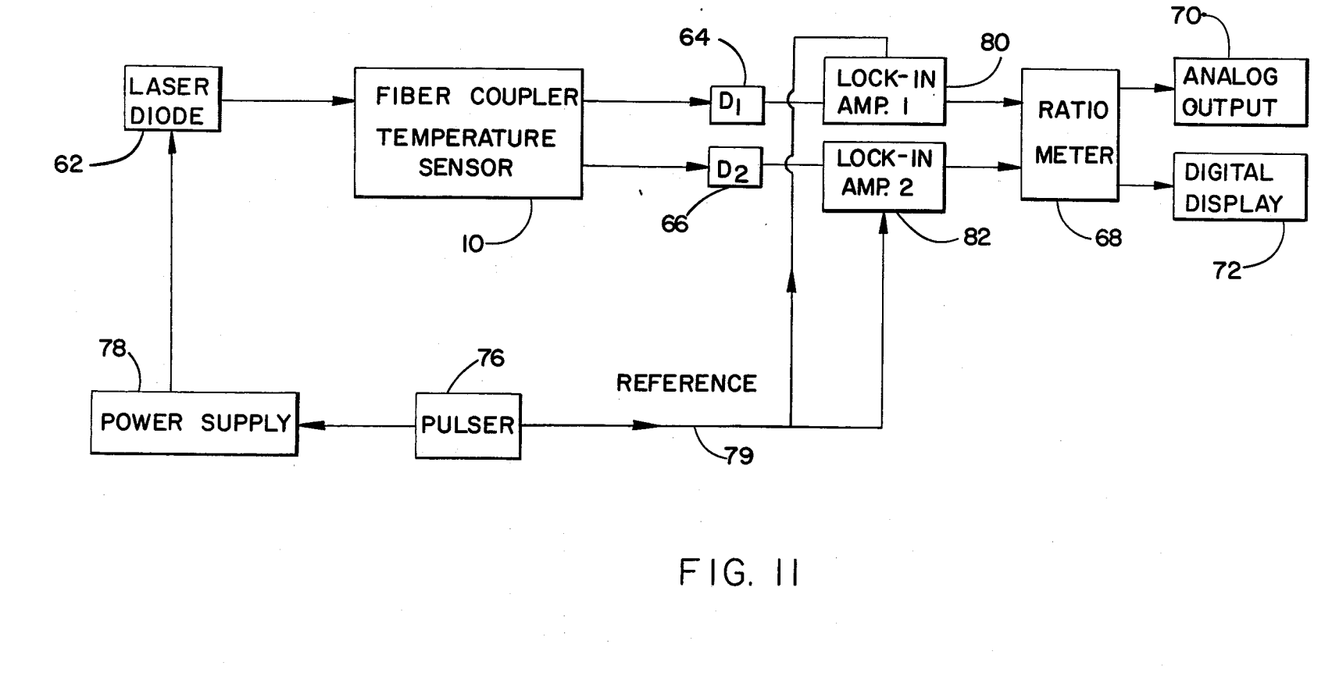
FIG. 11 is a schematic block diagram of an alternative electrical system for use in place of the electrical circuit of FIG. 10 for higher resolution measurements of temperature.

FIG. 11 provides a more accurate electronic system for measuring the detector output signals, and thus the temperature. In this example, a laser diode 62 supplies light to port A of the fiber optic coupler 10, and the outputs at ports B and D are monitored by detectors 64 and 66 as in FIG. 10. Unlike FIG. 10, however, the laser diode 62 does not supply continuous light, but, rather, provides pulsed light output which is induced by a pulse generator 76 controlling a diode power supply 78. In a preferred exemplary embodiment, the pulse generator 76 may provide square wave pulses at a frequency of 2 kHZ so that the output from the laser diode 62 is modulated at a 2 kHZ rate.

The output from the pulse generator 76 is supplied, in addition, as a reference on line 79 to a pair of lock-in amplifiers 80 and 82, which are connected to the output of the detectors 64 and 66, respectively. The reference input 79 to the amplifiers 80 and 82 provides a timing signal for enabling these amplifiers 80, 82. The amplifiers 80, 82 are well known in the prior art and each provide a signal proportional to the average peak value of the output from the detectors 64, 66, respectively. Thus, by using the reference signal on line 79, the lock-in amplifiers 80, 82 will measure the peak output level from the detectors 64, 66 and will average this peak level over a predetermined number of cycles of the pulse generator 76. This number of cycles is adjustable on each of the amplifiers 80, 82.

The output from the amplifiers 80, 82 is supplied to a ratio meter 68 identical to the ratio meter described in reference to FIG. 10 to provide an analog output 70 and digital display 72 corresponding to the temperature of the coupler 10.

By selecting the integration time of the lock in amplifiers, that is, the number of cycles of pulse generator 76 which are averaged by each of the amplifiers 80, 82, the band width of the measurement may be adjusted. For example, an integration time of 1 second corresponds to a measurement bandwidth of 1 HZ centered about the pulse generator 76 frequency. This reduced bandwidth substantially reduces the noise signal contribution in the output of the ratio meter 68, and thereby increases the accuracy of the measurements, while reducing the minimum time period between successive measurements to, in this particular example, one second. That is, measurements are available only at a one second repetition rate. Thus, by properly adjusting both amplifiers 80, 82 to an integration time which provides only the required measurement repetition rate, the noise bandwidth may be substantially reduced, and the signal-to-noise ratio significantly increased, increasing the accuracy of the measurement. An operator may thus select a proper tradeoff between measurement accuracy and repetition rate to fit the requirements of a particular measurement.

It has been found that by increasing the thickness of the layer of index matching oil between the substrates 16a and 16b (FIG. 1), the sensitivity of the coupler to temperature changes may be increased. This sensitivity can be further improved by polishing the coupler substrates, 16a, 16b closer to the cores of the fiber 12a, 12b and increasing the liquid layer thickness. Reducing the size of the substrates 16a, 16b, for example, to approximately five by five by ten millimeters yields a fairly low thermal mass and thus reduced response times. Adequate interconnection of the substrates 16a and 16b, as by welding, is important so that the physical size of the oil layer between the substrates 16a, 16b does not change the temperature. Furthermore, the substrate 16a should be constructed from material, such as quartz, which has a thermal expansion coefficient similar to that of the optical fibers to avoid damage to the optical fibers with temperature changes.

The temperature sensor provided by this optical fiber coupler provides repeatable, accurate temperature measurements typically in a range from approximately 0 degrees C. to 50 degrees C., depending upon the index matching liquid used. A sensitivity as high as 400 millivolts per degree Celsium is achievable, and resolutions providing minimum detectable temperature changes of 0.001 degree Celsium may be realized. The temperature transducer is insensitive to hostile electromagnetic environments and may thus be utilized in locations where other temperature measuring devices are not practical.

What is claimed is:

1. A method of measuring temperature, comprising:
   removing a portion of the cladding from the side of each of first and second single mode optical fibers to provide a coupling surface on each fiber;
   mounting said first and second optical fibers to form an evanescent fiber optic coupler by positioning said first and second fibers side-by-side and juxtaposing said coupling surfaces;
   selecting a temperature responsive material having an index of refraction which changes relative to the claddings of said fibers in response to temperature changes over the range of temperatures for which measurement of temperature is desired, to provide a coupling between said first and second fibers, said coupling changing with temperature said fibers being single mode throughout said range of temperatures;
   interposing said temperature responsive material between said coupling surfaces of said optical fibers; and
   measuring the coupling efficiency of said evanescent fiber optic coupler to determine said temperature.

2. A method of measuring temperature, as defined in claim 1, wherein said interposing step comprises providing a layer of index matching oil between said coupling surfaces.

3. A method of measuring temperature, as defined in claim 1, wherein said fiber optic coupler acts to couple light between said first and second fibers at the location of said coupling surfaces intermediate the ends of said first and second fibers; and wherein said measuring step comprises illuminating one end of said first optical fiber and measuring the light output at both the other end of said first optical fiber and at the corresponding end of said second optical fiber.

4. A method of measuring temperature, as defined in claim 3, wherein said measuring step includes:
   determining the ratio of said measured output of said corresponding end of said second optical fiber to the sum of said measured output at said other end of said first optical fiber and said corresponding end of said second optical fiber.

5. A method of measuring temperature, as defined in claim 4, wherein said illuminating step comprises providing modulated illumination and wherein said light output measuring step comprises measuring the peak output of illumination at said other end and corresponding end of said optical fibers and integrating said peak ouput to reduce the band width of said measuring step.

6. A transducer for measuring temperature comprising:
first and second single mode optical fibers, each having a portion of the cladding removed from the side thereof to provide a coupling surface on each fiber, to form an evanescent fiber optic coupler said first and second optical fibers mounted to position said first and second fibers side-by-side to juxtapose said coupling surfaces;
a layer of material interposed between said coupling surface of said fiber and said coupling surface of said second fiber in said coupler;
said interposed material being selected to have an index of refraction which varies with temperature, relative to the cladding refractive index, over the range of temperatures for which measurement of temperature is desired, to provide a coupling between said first and second fibers, said coupling changing with temperature said fibers being single mode over said range of temperatures; and
means for determining the temperature including means for measuring the coupling efficiency of said coupler.

7. A transducer, as defined in claim 6, wherein said measuring means comprises:
means for illuminating one of said first and second fibers in said coupler; and
means for detecting the illumination from said one of said first and second fibers and the other of said first and second fibers.

8. A transducer, as defined in claim 7, additionally comprising:
a ratio meter for providing an output signal in accordance with said detecting means.

9. A transducer, as defined in claim 8, additionally comprising:
means for displaying the output of said ratio meter.

10. A transducer, as defined in claim 9, additionally comprising:
means for reducing the bandwidth of said measuring means to reduce the noise signal contribution at said measuring means.

11. A temperature transducer, comprising:
first and second single mode optical fibers each having a portion of the cladding removed from a side thereof to provide a coupling surface on each fiber, said coupling surfaces juxtaposed to provide evanescent light coupling between said fibers;
means for rigidly mounting said first and second fibers side-by-side to position said coupling surfaces in a fixed relative juxtaposed orientation;
a material interposed between said coupling surfaces, for varying the coupling between said first and second fibers as a function of temperature, said material having a refractive index selected to vary relative to the refractive index of the cladding to change the coupling between said fibers over the range of temperatures for which measurement of temperature is desired, said fibers being single mode throughout said temperature range;
means for illuminating said first fiber;
means for measuring the illumination coupled to said second fiber; and
means responsive to said measuring means for indicating the temperature.

12. A temperature transducer, as defined in claim 11, wherein said first and second optical fibers are juxtaposed to provide overcoupling.

13. A temperature transducer, as defined in claim 11, wherin said means for rigidly mounting said first and second fibers comprises a first block having a groove for mounting said first fiber, second block including a groove for mounting said second fiber, a dam surrounding the grooved face of said second block, said grooves and fibers arranged in face-to-face relationship, separated by a distance determined by said dam.

14. A temperature transducer, as defined in claim 13, wherein said first and second optical fibers are ground to remove a portion of the cladding of said fibers and to provide said coupling surfaces as a planar surface of cladding coplanar with said blocks.

15. A temperature transducer, as defined in claim 14, wherein said means for rigidly mounting said fibers additionally comprises means for welding said blocks together.

16. A temperature transducer as defined in claim 11, wherein the measuring means comprises:
a mirror for reflecting the illumination in said second fiber back into said second fiber.

17. A temperature transducer, as defined in claim 16 including a second fiber optic coupling interposed between said illuminating means and the location at which said first and second fibers are coupled, said second coupler coupling light from said first fiber to a third fiber; and
an optical isolator interposed between said illuminating means and said fiber optic coupler.

18. A temperature transducer, as defined in claim 11, additionally comprising:
means for prepositioning said first and second optical fibers within a linear dynamic range of coupling for said fibers.

19. A temperature transducer, as defined in claim 11, wherein said means for measuring illumination of said fibers is located on the same side of said mounting means as said means for illuminating.

20. A temperature transducer, as defined in claim 11, wherein said first and second optical fibers are looped around and secured to said mounting means such that they exit exclusively from one side of said mounting means.

* * * * *